US010600201B2

(12) United States Patent  
Tanaka et al.

(10) Patent No.: US 10,600,201 B2  
(45) Date of Patent: Mar. 24, 2020

(54) METHOD OF DETERMINING FOCUS LENS POSITION, CONTROL PROGRAM FOR MAKING COMPUTER EXECUTE THE METHOD, AND IMAGING DEVICE

(71) Applicant: Renesas Electronics Corporation, Tokyo (JP)

(72) Inventors: Shinya Tanaka, Tokyo (JP); Koji Shida, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 187 days.

(21) Appl. No.: 15/828,776

(22) Filed: Dec. 1, 2017

(65) Prior Publication Data

US 2018/0182125 A1 Jun. 28, 2018

(30) Foreign Application Priority Data

Dec. 27, 2016 (JP) ................. 2016-252687

(51) Int. Cl.
| | |
|---|---|
| *G06T 7/00* | (2017.01) |
| *G06T 7/73* | (2017.01) |
| *G06T 7/80* | (2017.01) |
| *G03B 13/36* | (2006.01) |
| *G02B 7/28* | (2006.01) |

(52) U.S. Cl.  
CPC .............. *G06T 7/73* (2017.01); *G02B 7/28* (2013.01); *G03B 13/36* (2013.01); *G06T 7/80* (2017.01)

(58) Field of Classification Search  
None  
See application file for complete search history.

(56) References Cited

U.S. PATENT DOCUMENTS

| | | | |
|---|---|---|---|
| 6,552,748 B1 | 4/2003 | Sugimoto | |
| 7,184,079 B2* | 2/2007 | Hoshuyama | H04N 9/045 348/223.1 |
| 8,462,988 B2* | 6/2013 | Boon | G06K 9/00798 382/104 |
| 2007/0206938 A1* | 9/2007 | Tanaka | G02B 7/102 396/106 |
| 2008/0225278 A1* | 9/2008 | Namba | G01N 21/6458 356/123 |

(Continued)

FOREIGN PATENT DOCUMENTS

| | | | | |
|---|---|---|---|---|
| JP | 10-239581 A | | 9/1998 | |
| JP | 2016142647 A | * | 8/2016 | .............. G01C 3/06 |

*Primary Examiner* — Delomia L Gilliard  
(74) *Attorney, Agent, or Firm* — McDermott Will & Emery LLP

(57) ABSTRACT

A method of determining a position of a focus lens includes the steps of detecting luminance values corresponding to a plurality of imaging elements which detect light via a focus lens while moving the focus lens, calculating a contrast value for evaluation of a focused state of a subject image on the basis of the detected luminance values corresponding to the imaging elements, specifying the largest luminance value in the detected luminance values corresponding to the imaging elements, specifying a range in which the largest luminance value is not less than a value which is determined in advance in a moving range of the focus lens and determining the position of the focus lens on the basis of the contrast value in the specified range of the position of the focus lens.

8 Claims, 12 Drawing Sheets

(56) References Cited

U.S. PATENT DOCUMENTS

2009/0073304 A1\* 3/2009 Kumagai ............... G03B 13/30
　　　　　　　　　　　　　　　　　　　　　348/345
2010/0053360 A1\* 3/2010 Hasegawa .............. H04N 5/232
　　　　　　　　　　　　　　　　　　　　　348/222.1
2012/0327188 A1\* 12/2012 Takemura .......... G06K 9/00798
　　　　　　　　　　　　　　　　　　　　　348/46

\* cited by examiner

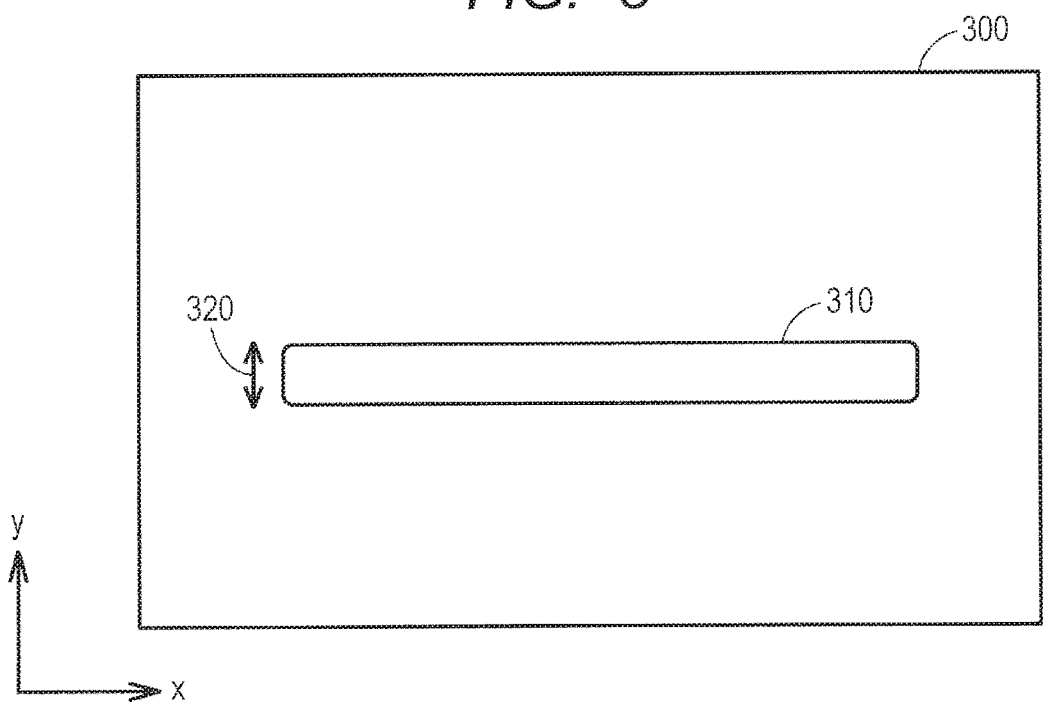
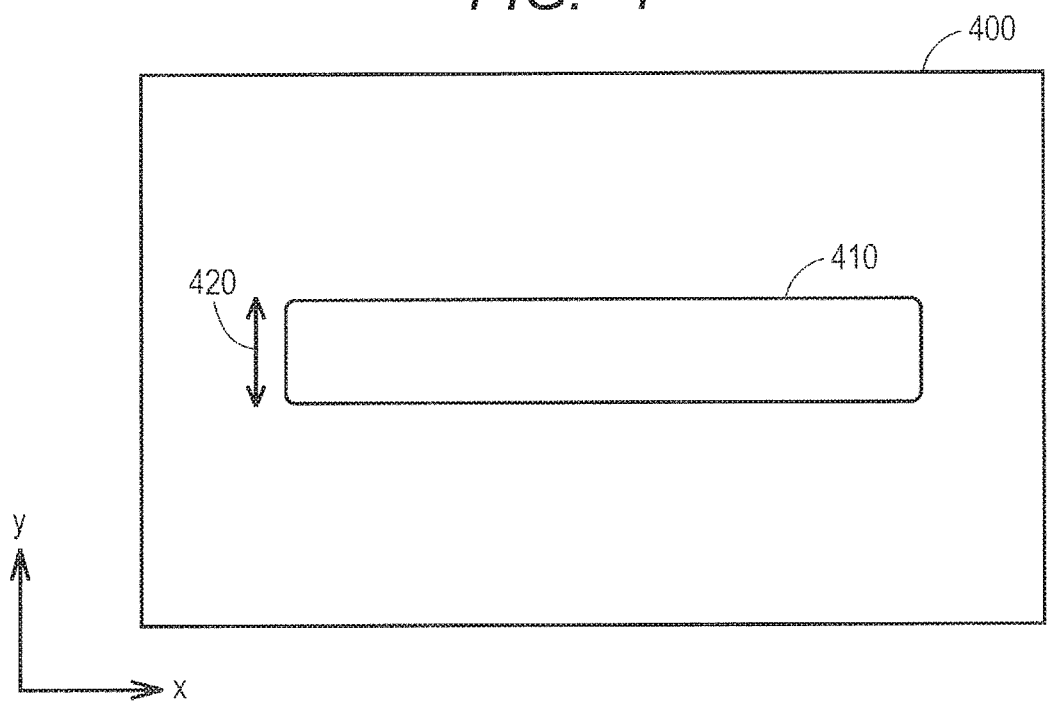

METHOD OF DETERMINING FOCUS LENS POSITION, CONTROL PROGRAM FOR MAKING COMPUTER EXECUTE THE METHOD, AND IMAGING DEVICE

CROSS-REFERENCE TO RELATED APPLICATIONS

The disclosure of Japanese Patent Application No. 2016-252687 filed on Dec. 27, 2016 including the specification, drawings and abstract is incorporated herein by reference in its entirety.

BACKGROUND

The present disclosure relates to processing adapted to determine a position of a focus lens and more specifically relates to the processing adapted to determine the position of the focus lens in an imaging device which follows a contrast autofocus system.

Currently available cameras adopt a technology which is also called an autofocus (AF) technology for automatically focusing on an object. As the autofocus technology, a phase difference AF system and the contrast AF system are mainly given.

In the phase difference AF system, light which enters the camera through a lens is split into two streaks of light and a position of a focus lens is determined from a space between two formed images. In the contrast AF system, the position of the focus lens is determined in such a manner that a contrast difference of an image that an imaging element generates is increased.

Incidentally, the imaging device which follows the contrast AF system has such an issue that in a case where a high-luminance object (for example, a fluorescent lamp, a streetlamp and so forth) is included in a subject, the focus lens is set to a position which is greatly displaced from a focus position.

As countermeasures to such an issue, for example, Japanese Unexamined Patent Application Publication No. Hei10-239581 discloses an imaging device that "a case where the maximum position of the focus evaluation value that two focus evaluation value peaks are present and the optical focus position do not mutually match is detected and the focus motor is driven in such a manner that the focus lens reaches the position where the focus evaluation value between the two peaks is minimized or the middle-distance of the autofocus lens that a failure is least likely to occur stochastically (see "ABSTRACT").

SUMMARY

However, in the imaging device disclosed in Japanese Unexamined Patent Application Publication No. Hei10-239581, control to install the focus lens at a position which is thought to be close to the focus position stochastically is performed and it is not possible to accurately install the focus lens to the focus position. Accordingly, a technology of determining the accurate focus position in the case where the high-luminance object is included in the subject is requested.

The present disclosure has been made in order to solve such an issue as described above and aims to provide a method which makes it possible to determine the accurate focus position even in the case where the high-luminance object is included in the subject. The disclosure also aims to provide a program which makes it possible to determine the accurate focus position even in the case where the high-luminance object is included in the subject. The disclosure further aims to provide an imaging device which is able to determine the accurate focus position even in the case where the high-luminance object is included in the subject.

Other matters to be solved and novel features of the disclosure will become apparent from description of the specification and the appended drawings.

According to one embodiment of the disclosure, there is provided a method of determining the position of the focus lens. This method includes the steps of detecting luminance values corresponding to a plurality of imaging elements which detect light via a focus lens while moving the focus lens, calculating a contrast value for evaluation of a focused state of a subject image on the basis of the detected luminance values corresponding to the imaging elements, specifying the largest luminance value in the detected luminance values corresponding to the imaging elements, specifying a range in which the largest luminance value is not less than a value which is determined in advance in a moving range of the focus lens and determining the position of the focus lens on the basis of the contrast value in the specified range of the position of the focus lens.

The method of determining the position of the focus lens according to one embodiment makes it possible to determine the accurate focus position even in the case where the high-luminance object is included in the subject. Therefore, the imaging device which follows this method is able to generate a clear image which is not out of focus.

The above-described and other aims, features, aspects and advantages of the disclosed technical features will become apparent from the following detailed description relating to the present disclosure which will be understood in relation to the appended drawings.

BRIEF DESCRIPTION OF THE DRAWINGS

FIG. 3 is a diagram illustrating one example of a focused image.

FIG. 4 is a diagram illustrating one example of a defocused image.

DETAILED DESCRIPTION

In the following, embodiments of the present disclosure will be described with reference to the drawings. In the following description, the same symbols are assigned to the same components. The components to which the same symbols are assigned are similar to each other in name and function. Therefore, detailed description thereof is not repetitively made. Incidentally, respective embodiments and respective altered examples which will be described in the following may be appropriately and selectively combined with one another.

[Introduction]

Figure 1:
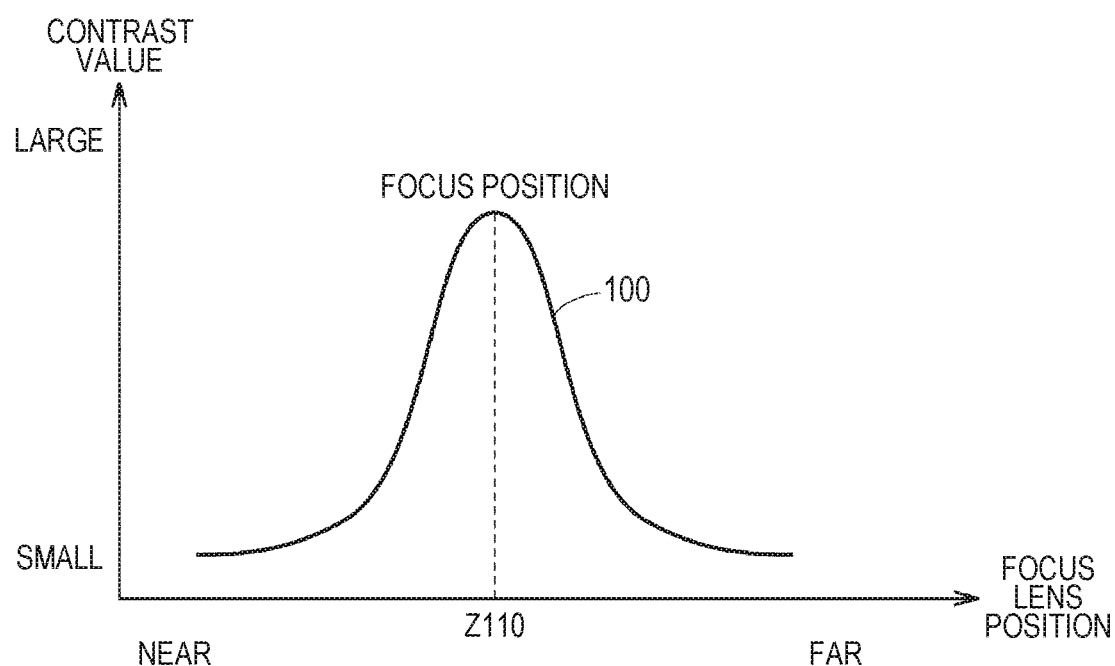
FIG. 1 is a diagram illustrating one example of a contrast AF system.

FIG. 1 is a diagram illustrating one example of the contrast AF system. A horizontal axis indicates a position of a focus lens relative to an imaging element. The focus lens is focused on a proximal-distance point as the focus lens approaches the imaging element. On the other hand, the focus lens is focused on a distal-distance point as the focus lens goes away from the imaging element. A vertical axis indicates a contrast value which is calculated from image data (luminance data). A line 100 indicates the contrast value of the image data which is generated by the imaging element while shifting the position of the focus lens. The contrast value is a value obtained by integrating high frequency components of the image data. The contrast value is a value used for evaluation of a focused state of a subject image.

In general, it is known that in a case where the subject which is captured as a captured image is used as an object for focusing, the contrast value obtained from the captured image reaches a maximum value in the focused state. In FIG. 1, when the focus lens reaches a position 2110, the contrast value reaches the maximum value. Therefore, an imaging device decides that the position 2110 is a focus position.

Figure 2:
FIG. 2 is a diagram illustrating one example of an image in which the high-luminance object (the fluorescent lamp) is included in a subject.

However, in a case where the high-luminance object (the fluorescent lamp in FIG. 2) is included in the subject as illustrated in FIG. 2, there are cases where when the focus lens is installed at a position which is not the focus position, the contrast value reaches the maximum value. The reason therefor will be described by using FIG. 3 to FIG. 5.

FIG. 3 illustrates one example of a focused image 300. FIG. 4 illustrates one example of a defocused image 400. The image 300 and the image 400 are images which are generated by photographing the same fluorescent lamp using the imaging device.

A Y-direction (vertical-direction) width 320 of a fluorescent lamp 310 included in the image 300 is shorter than a Y-direction width 420 of a fluorescent lamp 410 included in the image 400. In other words, a range that a luminance value in the vertical direction is high in the defocused image 400 is wider than the range that the luminance value in the vertical direction is high in the focused image 300. Therefore, the contract value along an X direction (a transverse direction) of the image 400 becomes lager than the contrast value along the transverse direction of the image 300. Consequently, in a case where the high-luminance object is included in the subject, there is a possibility that the contrast value may reach the maximum value in a state where the position of the focus lens is displaced from the focus position.

Figure 5:
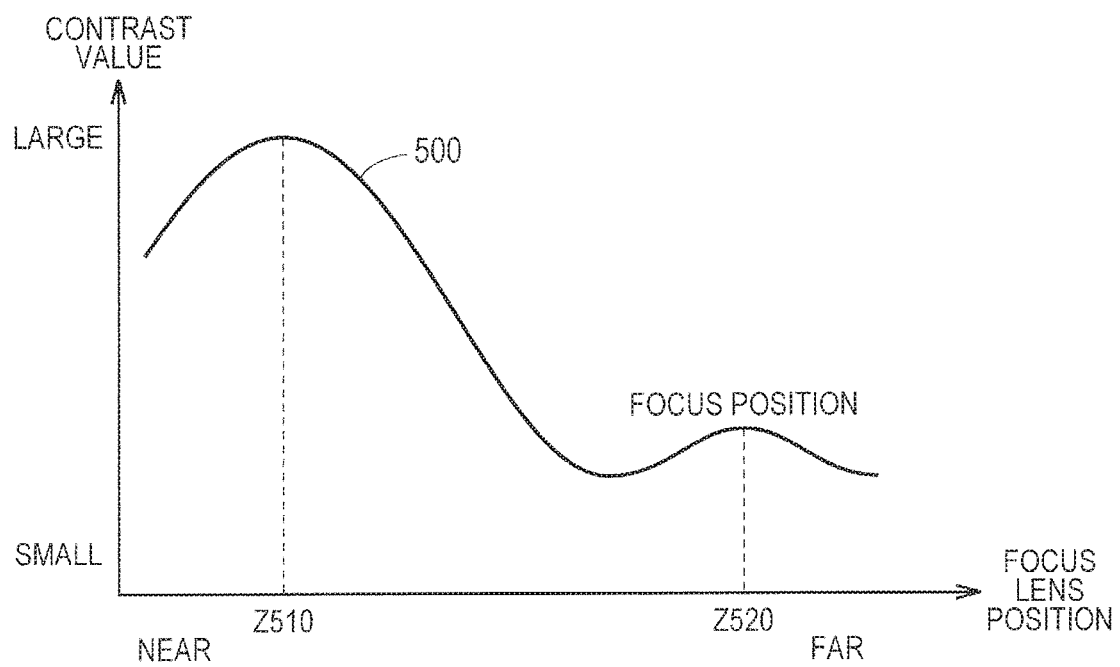
FIG. 5 is a diagram illustrating one example of a contrast value in the case where the high-luminance object is included in the subject.

FIG. 5 illustrates one example of the contrast value obtained in the case where the high-luminance object is included in the subject. A line 500 indicates the contrast value of image data which is generated by the imaging element while shifting the position of the focus lens. In FIG. 5, it is supposed that a position 2520 is the focus position. In an existing imaging device which follows the contrast AF system, the focus lens is installed not at the position 2520 but at a position 2510 where the contrast value reaches the maximum value. Consequently, there is a possibility that the above-described imaging device may generate the defocused image. In the following, a method of determining the position of the focus lens which is able to solve such an issue will be described.

[First Embodiment]
(Imaging Device 600)

Figure 6:
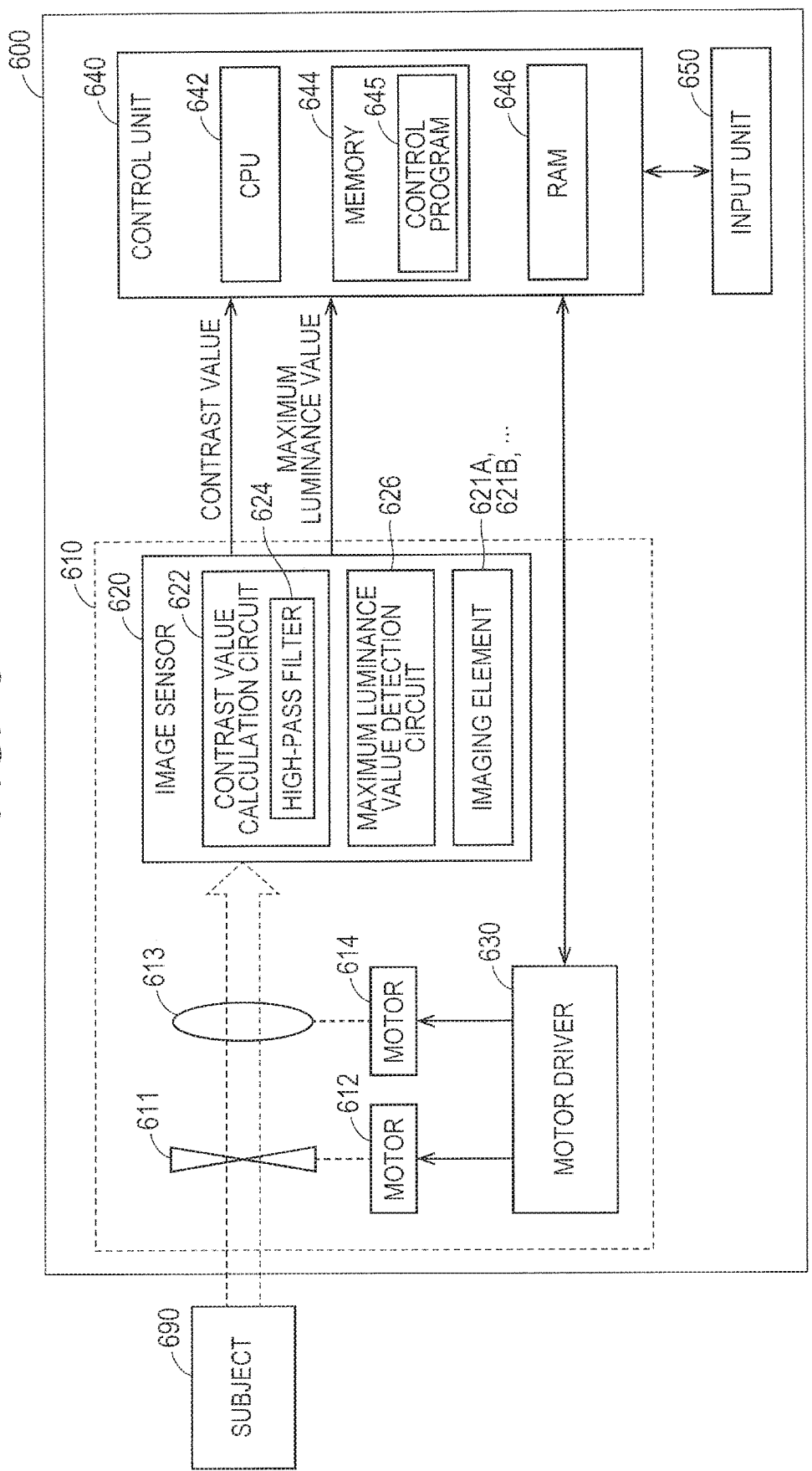
FIG. 6 is a diagram illustrating one configuration example of an imaging device according to a first embodiment.

FIG. 6 illustrates one configuration example of the imaging device 600. Description will be made with reference to FIG. 6. The imaging device 600 includes a lens module 610, a control unit, 640, an input unit 650 and so forth.

The lens module 610 includes a zoom lens 611, a motor 612, a focus lens 613, a motor 614, an image sensor 620, a motor driver 630 and so forth.

The motor 612 is configured to freely move the zoom lens 611. The motor 614 is configured to freely move the focus lens 613. As one example, it is supposed that the motors 612 and 614 are stepping motors. The imaging device 600 is configured to freely change a focal distance by moving the zoom lens 611. In addition, the imaging device 600 moves the focus lens 613 to the focus position.

The image sensor 620 includes a plurality of imaging elements 621A, 621B, . . . , a contrast value calculation 622, a maximum luminance value detection circuit 626 and so forth. The contrast value calculation circuit 622 includes a high-pass filter 624. In the following, the imaging elements 621A, 621B, . . . will be generically named an "imaging element 621". As one example, the imaging element 621 may be a CMOS (Complementary MOS) image sensor. In addition, as one example, the image sensor 620 may include about 2073600 (=1920×1080) imaging elements 621.

The imaging device 600 detects light which enters via the focus lens 613 by the imaging element 621 while moving the focus lens 613. In other words, the imaging device 600 generates a plurality of images by using the imaging element 621 while moving the focus lens 613.

The contrast value calculation circuit 622 detects each luminance value which corresponds to each output (for example, a current value) from each of the plurality of imaging elements 621 for each of the plurality of images. The contrast value calculation circuit 622 further performs a process by the high-pass filter 624 having a predetermined frequency characteristic on each luminance value which corresponds to each of the plurality of imaging elements 621 and calculates an integrated value of a result of execution of the process as the contrast value. The contrast value calculation circuit 622 outputs the contrast value calculated for each of the plurality of images to the control unit 640.

The maximum luminance value detection circuit 626 detects the largest luminance value (in the following, also referred to as a "maximum luminance value") in the luminance values which respectively correspond to the plurality of imaging elements 621. The maximum luminance value detection circuit 626 outputs the maximum luminance value which is detected for each of the plurality of images to the control unit 640. In addition, the image sensor 620 outputs the image data generated by the plurality of imaging elements 621 to the control unit 640.

Incidentally, in the above-described example, the contrast value calculation circuit 622 and the maximum luminance value detection circuit 626 are configured to perform the above-described process on all the luminance values which respectively correspond to the plurality of imaging elements 621. Alternatively, the contrast value calculation circuit 622 and the maximum luminance value detection circuit 626 may be configured to perform the above-described process on the luminance values corresponding to the imaging elements 621 which are installed in a predetermined region (for example, a region around the center) in the plurality of imaging elements 621.

The control unit 640 includes a CPU 642, a memory 644, a RAM (Random Access Memory) 646 and so forth. The CPU 642 controls the operation of the imaging device 600 by reading and executing a control program 645 which is stored in the memory 644. The memory 644 is typically configured by a nonvolatile flash memory. The memory 644 is able to store the control program 645 and the image data input from the image sensor 620. The RAM 646 is typically configured by a DRAM (Dynamic Random Access Memory) and so forth. The RAM 646 is able to temporarily store data and the image data which are necessary for the CPU 642 to execute the control program 645. Accordingly, the RAM 646 functions as a so-called working memory.

The CPU 642 determines the installation position of the focus lens 613 on the basis of the contrast values and the maximum luminance values input from the image sensor 620. The CPU 642 outputs instructions to the motor driver 630 in such a manner that the focus lens 613 moves to the determined installation position.

The motor driver 630 drives the motor 614 in accordance with the instructions input from the CPU 642. Thereby, the focus lens 613 is moved to the determined installation position. The input unit 650 is configured to freely accept a user operation. As one example, the input unit 650 is configured by a physical button group.

The imaging device 600 so configured as described above is able to photograph the high-luminance subject. For example, the imaging device 600 is able to photograph the scenes outside the window from within a room in the daytime. As another example, the imaging device 600 is able to photograph an object which is irradiated with spot light of a flashlight, a cell phone and so forth. Alternatively, the imaging device 600 may be used as a monitoring camera. In a case where the imaging device 600 is installed on the road side, in a parking lot and so forth as the monitoring camera, the imaging device 600 is able to photograph an object which is irradiated with a headlight of a vehicle at night.

Incidentally, the imaging device 600 may have a diaphragm adapted to adjust an amount of light input into the image sensor 620, an ISP (Image Signal Processor) adapted to perform image processing, a display adapted to display the subject image and so forth, not limited to the configuration illustrated in FIG. 6.

In addition, in the above-described example, the image sensor 620 is configured to calculate the contrast value and the maximum luminance value. Alternatively, the CPU 642 of the control unit 640 may be configured to calculate the above-described contrast and maximum luminance value.

(Control for Determination of Focus Position)

Figure 7:
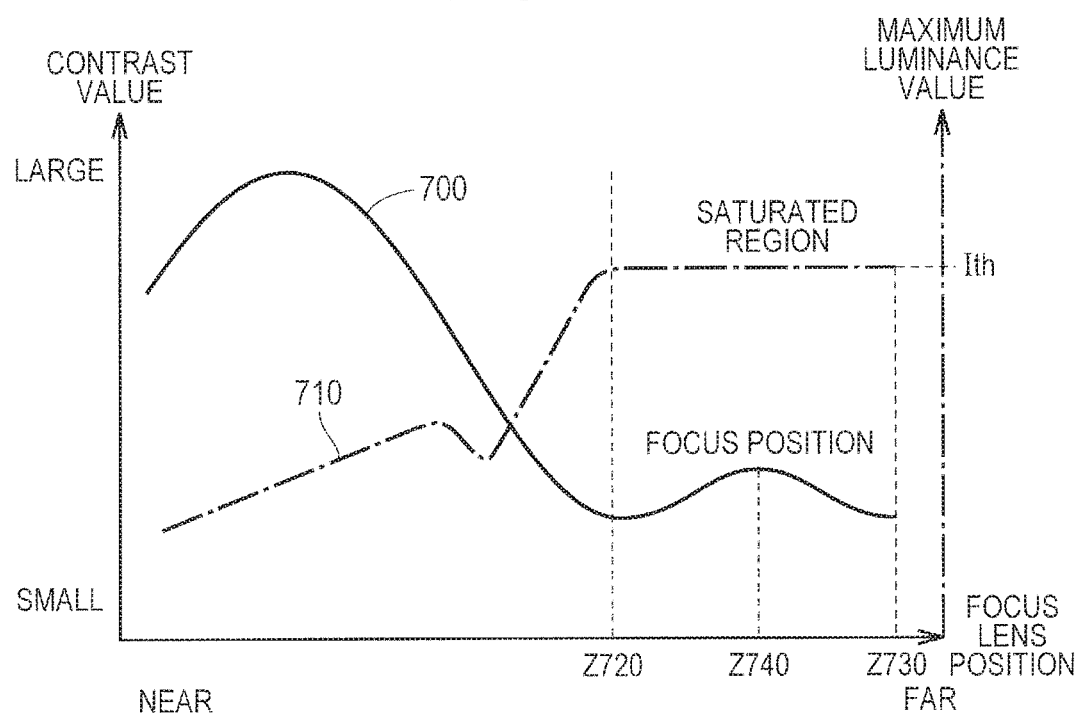
FIG. 7 is a diagram illustrating one example of a focus position detection method.

FIG. 7 is a diagram illustrating one example of a method of detecting the focus position. The horizontal axis indicates a position of the focus lens 613 relative to a sensor surface that the imaging element 621 configures. A left-side vertical axis indicates the magnitude of the contrast value and a right-side vertical axis indicates the magnitude of the maximum luminance value. In FIG. 7, it is assumed that a position 2740 is the focus position.

A line 700 indicates the contrast value of an image which is generated by the imaging element 621 while shifting the position of the focus lens 613. A line 710 indicates the maximum luminance value of the image which is generated by the imaging element 621 while shifting the position of the focus lens 613.

As indicated by the line 710, the maximum luminance value is increased around the focus position (the position Z740). This is because when the position of the focus lens 613 is greatly displaced from the focus position, the high-luminance subject is captured in a greatly defocused state and therefore the maximum luminance value is decreased and when the position of the focus lens 613 approaches the focus position, the high-luminance subject is clearly captured and therefore the maximum luminance value is increased. The imaging device 600 according to the first embodiment specifies the focus position by utilizing this characteristic.

Specifically, the control unit 640 of the imaging device 600 specifies a range (in the following, also referred to as a "saturated region") in which the maximum luminance value becomes not less than a luminance value 1th which is determined in advance in a moving range of the focus lens 613. The luminance value 1th which is determined in advance may be, for example, the largest luminance value which is set in an A/D converter (not illustrated) included in the image sensor 620. For example, in a case where the A/D converter converts analog data into digital data with a resolution of 12 bits, the luminance value 1th may be about 4095. In the example illustrated in FIG. 7, the control unit 640 specifies that a range from the position Z720 to the position 2730 is the saturated region.

The control unit 640 determines the position of the focus lens 613 on the basis of the contrast value in the specified saturated region. More specifically, the control unit 640 determines the position of the focus lens 613 in such a manner that the contrast value in the specified saturated region becomes the largest. Thereby, the imaging device 600 is able to install the focus lens 613 not at a peak position near the sensor surface but at the position 2740 (the focus position) accurately.

(Flow of Control)

Figure 8:
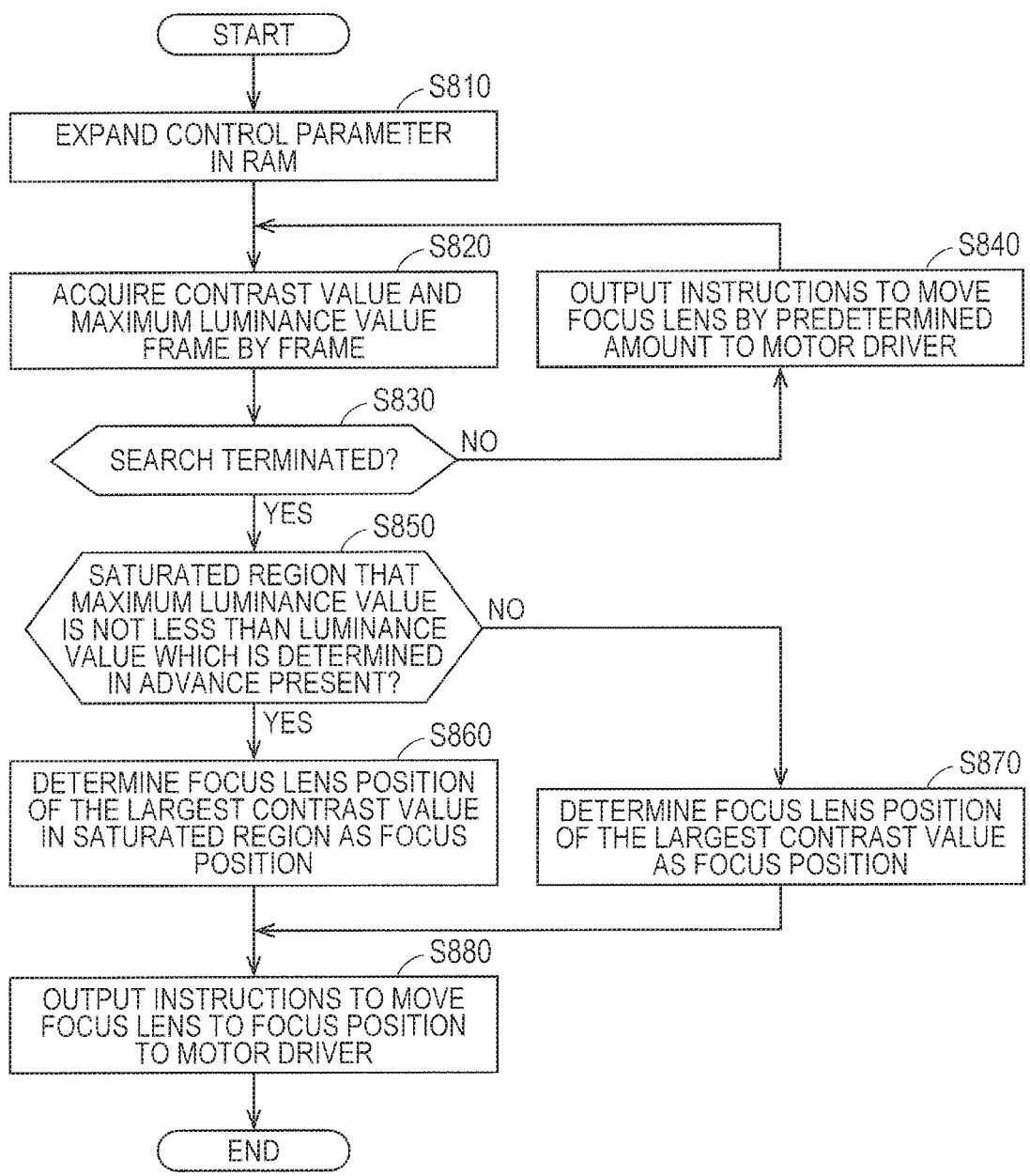
FIG. 8 is a flowchart (a part 1) illustrating one example of control for installation of a focus lens.

FIG. 8 is a flowchart illustrating one example of a series of the above-described controlling operations performed to install the focus lens 613. The CPU 642 executes the control program 645 which is stored in the memory 644 and thereby processes illustrated in FIG. 8 are achieved.

In step S810, the CPU 642 expands a control parameter included in the control program 645 in the RAM 646. As one example, the control parameter includes a parameter adapted to terminate search of the focus position, in other words, adapted to terminate movement of the focus lens 613. The above-described parameter may be, for example, a range of reduction of the contrast value. As another example, the control parameter may include a moving velocity of the focus lens 613.

In step S820. The CPU 642 acquires the contrast value and the maximum luminance value from the image sensor 620 frame by frame of the imaging device 600. More specifically, the image sensor 620 calculates the contrast value and the maximum luminance value in accordance with reception of a vertical synchronous signal from the control unit 640 and outputs these pieces of data to the control unit 640. As one example, the imaging device 600 may operate at about 60 fps (frame per second).

In step S830, the CPU 642 decides whether the search (the movement of the focus lens 613) is to be terminated. As one example, in a case where the range of reduction of the contrast value exceeds a value (a parameter value) which is determined in advance, the CPU 642 decides to terminate the search. Thereby, the imaging device 600 is able to reduce a time taken for controlling to move the focus lens 613 to the focus position (a time taken for autofocusing). Alternatively, in a case where the focus lens 613 completes movement over a range which is determined in advance (for example, a movable range of the focus lens 613), the CPU 642 may decide to terminate the search.

In a case where the CPU 642 decides to terminate the search (YES in step S830), the CPU 642 proceeds the process to step S850. On the other hand, in a case where the CPU 642 decides not to terminate the search (NO in step S830), the CPU 642 proceeds the process to step S840.

In step S840, the CPU 642 outputs instructions to move the focus lens 613 by a predetermined amount (for example, on step of the motor 614) to the motor driver 630. Thereby, the focus lens 613 is moved by the predetermined amount. Then, the CPU 642 returns the process to step S820.

In step S850, the CPU 642 decides whether the saturated region in which the maximum luminance value exceeds the luminance value 1th which is determined in advance is present in the moving range (a searching range) of the focus lens 613.

In a case where the CPU 642 decides that the saturated region is present (YES in step S850), the CPU 642 proceeds the process to step S860. On the other hand, in a case where the CPU 642 decides that the saturated region is not present (NO in step S850), the CPU 642 proceeds the process to step S870.

In step S860, the CPU 642 decides the position of the focus lens 613 which corresponds to the largest contrast value in the saturated region as the focus position (a focused focal point).

In step S870, the CPU 642 determines the position of the focus lens which corresponds to the largest contrast value as the focus position.

In step S880, the CPU 642 outputs instructions to move the focus lens 613 to the determined focus position to the motor driver 630. Thereby, the focus lens 613 is moved to the determined focus position.

Owing to execution of the above-described processes, even in a case where the high-luminance object is included in the subject, the imaging device 600 according to the first embodiment is able to accurately install the focus lens 613 at the focus position. Therefore, the imaging device 600 is able to generate the clear image which is not defocused Incidentally, in the above-described example, the CPU 642 is configured to determine the position of the focus lens which corresponds to the largest contrast value as the focus position (step S860 and step S870). Alternatively, the CPU 642 may be configured to determine the position of the focus lens 613 which corresponds to a maximal value (a peak) as the focus position.

In addition, in the above-described example, the CPU 642 is configured to typically perform the process of deciding whether the saturated region is present (step S850). Alternatively, the CPU 642 may be configured to determine whether the above-described process is performed. As one example, the CPU 642 may be configured to perform the above-described process only in a case where the CPU 642 decides that the high-luminance object is included in the subject. For example, in a case where the maximum luminance value becomes not less than the luminance value 1th, the CPU may decide that the high-luminance object is included in the subject. As another example, the user operates the input unit 650 and thereby the imaging device 600 may be set to perform or not to perform the above-described process.

[Second Embodiment]

The imaging device 600 according to the first embodiment is configured to determine the position where the contrast value reaches the maximum value in the saturated region as the focus position. However, there is a possibility that the imaging device 600 may install the focus lens 613 at a position which is not the focus position depending on the situation. In the following, a specific example thereof will be described.

Figure 9:
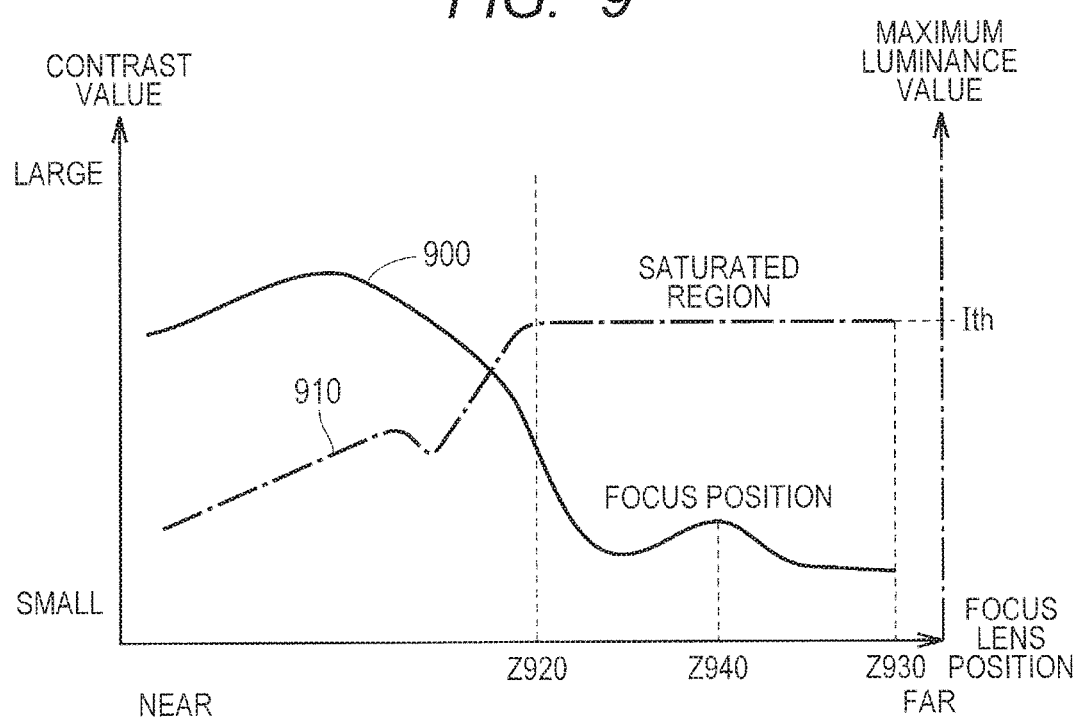
FIG. 9 is a diagram illustrating one example of the contrast value and a maximum luminance value relative to an installation position of the focus lens.

FIG. 9 is a diagram illustrating one example of the contrast value and the maximum luminance value relative to the installation position of the focus lens 613. In FIG. 9, it is assumed that a position 2940 is the focus position. In addition, in FIG. 9, and FIG. 10 and FIG. 11 which will be described later, it is assumed that the data that the plurality of imaging elements 621 output is common among the plurality of imaging elements 621 and the high-luminance object is included in the subject.

A line 900 indicates the contrast value of an image which is generated by the imaging element 621 while shifting the position of the focus lens 613. A line 910 indicates the maximum luminance value of the image which is generated by the imaging elements 621 while shifting the position of the focus lens 613.

The imaging device 600 specifies that a range from a position 2920 to a position 2930 is the saturated region on the basis of the line 910 and the luminance value 1th which is determined in advance. In this case, a situation that the imaging device 600 according to the first embodiment may erroneously decide that not the position 2940 but the position 2920 where the contrast value is the highest in the saturated region is the focus position may occur. The larger the moving range of the focus lens 613 is (the larger the optical magnification by the zoom lens 611 is, the more such a situation is liable to occur. In the following, control that the imaging device according to the second embodiment performs so as to avoid the above-described situation will be described. Incidentally, also in the second embodiment, the imaging device 600 which is described with reference to FIG. 6 is used.

(Control to Determine Focus Position)

Figure 10:
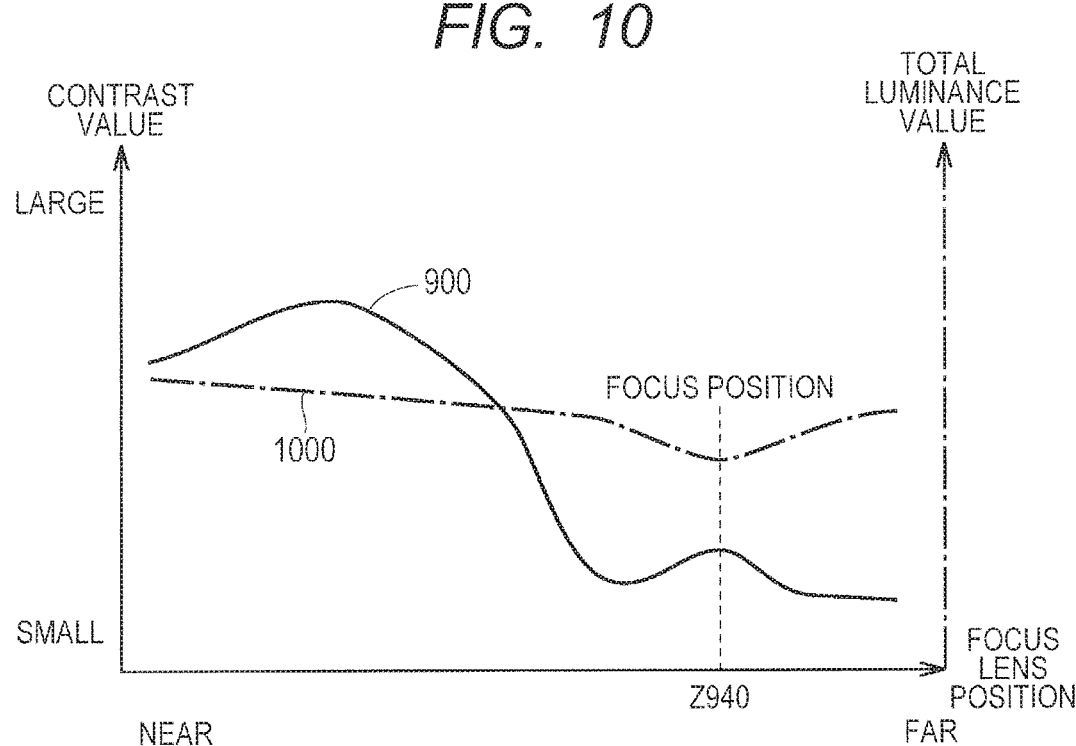
FIG. 10 is a diagram illustrating one example of the contrast value and a total luminance value relative to the installation position of the focus lens.

FIG. 10 is a diagram illustrating one example of the contrast value and a total luminance value relative to the installation position of the focus lens 613. The total luminance value is the total value of the luminance values which corresponds to the plurality of respective imaging elements 621. Since the line 900 illustrated in FIG. 10 is the same as the line 900 which is described with reference to FIG. 9, repetitive description thereof is not made. A line 1000 indicates the total luminance value of an image which is generated by the plurality of imaging elements 621 while shifting the position of the focus lens 613.

The image sensor 620 according to the second embodiment outputs the luminance values which correspond to the plurality of respective imaging elements 621 to the control unit 640. The CPU 642 of the control unit 640 calculates the total luminance value by integrating the luminance values. Incidentally, alternatively, the total luminance value may be calculated by the image sensor 620 and may be calculated by the ISP (Image Signal Processor) which is not illustrated.

As indicated by the line 1000, the total luminance value becomes the smallest near the position 2940 (the focus position) and is gradually increased as it goes away from the position 2940. The reason therefor is that a high-luminance region in the image is increased as the image is defocused. The imaging device 600 according to the second embodiment performs the control to determine the focus position by utilizing this characteristic. The control will be specifically described by using FIG. 11.

Figure 11:
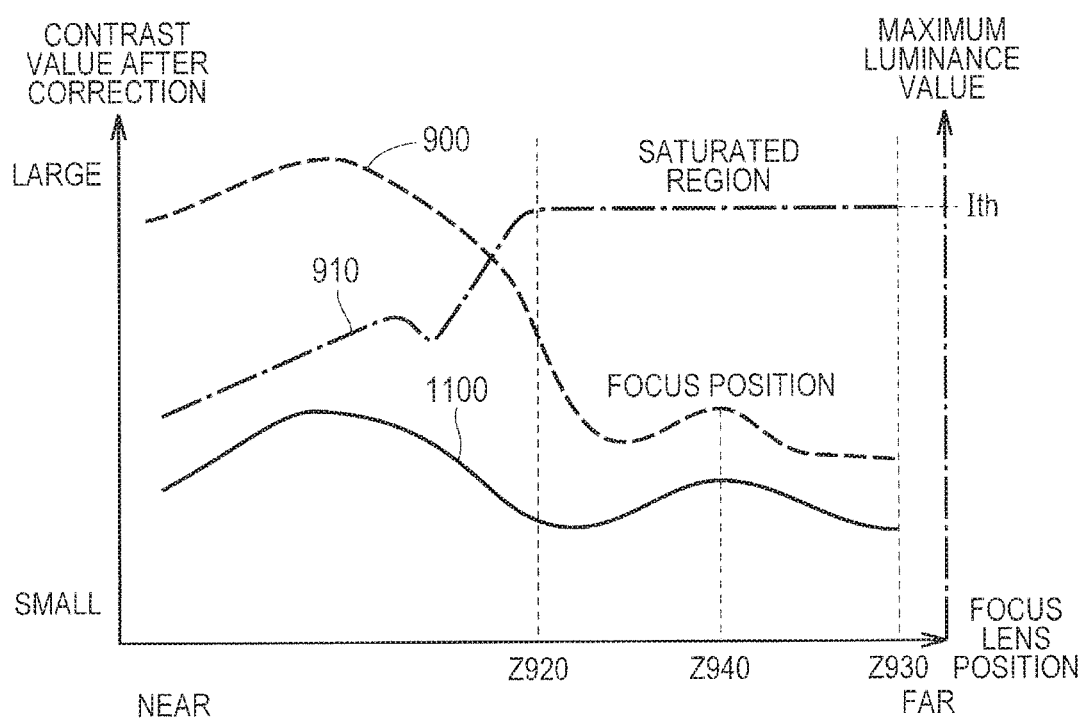
FIG. 11 is a diagram illustrating one example of the contrast value, a contrast value obtained after correction and the maximum luminance value relative to the installation position of the focus lens.

FIG. 11 is a diagram illustrating one example of the contrast value, a contrast value obtained after correction and the maximum luminance value relative to the installation position of the focus lens 613. Since the lines 900 and 910 illustrated in FIG. 11 are respectively the same as the lines 900 and 910 which are described with reference to FIG. 9, repetitive description thereof is not made. A line 1100 is a line obtained by correcting the line 900 (the contrast value) on the basis of the total luminance value which is described with reference to FIG. 10.

As one example, the line 1100 may have a value obtained by dividing each contrast value of the line 900 by the corresponding total luminance value. Owing to execution of this correcting process, the value near the focus position is emphasized on the line 1100 (the contrast value obtained after correction).

The imaging device 600 according to the second embodiment determines the position of the focus lens 613 in such a manner that the contrast value obtained after correction in the saturated region becomes the largest. Thereby, the imaging device 600 is able to install the focus lens 613 not at the peak position near the sensor surface but at the position 2940 (the focus position) accurately.

(Flow of Control)

Figure 12:
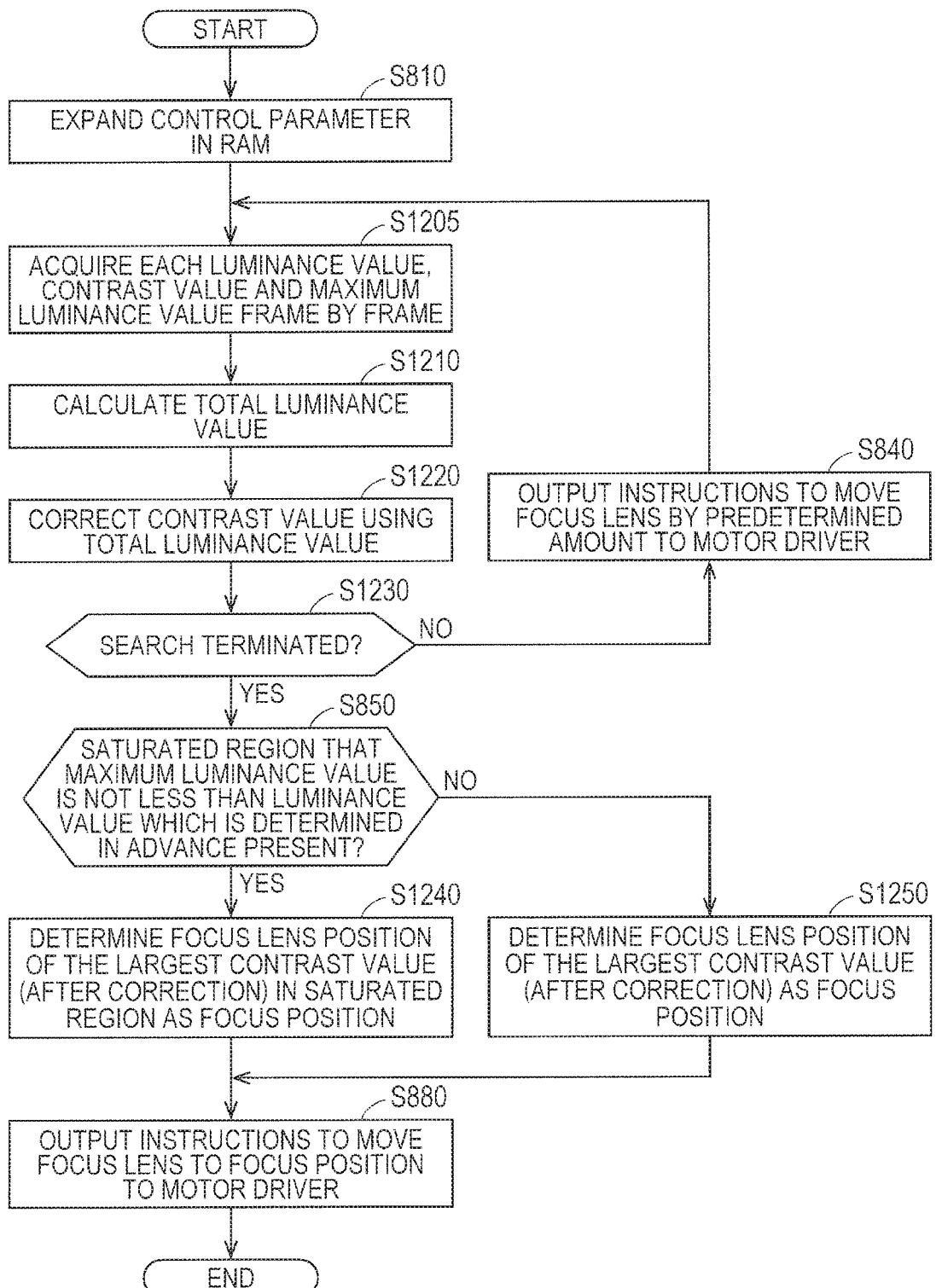
FIG. 12 is a flowchart (a part 2) illustrating one example of control for installation of the focus lens.

FIG. 12 is a flowchart illustrating one example of a series of the above-described controlling operations performed to install the focus lens 13. The CPU 642 executes the control program 645 stored in the memory 644 and thereby processes illustrated in FIG. 12 are achieved. Incidentally, in the processes illustrated in FIG. 13, the processes to which the same symbols as those in FIG. 8 are the same as the corresponding processes in FIG. 8. Therefore, repetitive description of the processes is not made.

In step S1205, the CPU 642 acquires the respective luminance values corresponding to the plurality of imaging elements 621 in addition to the contrast values and the maximum luminance values from the image sensor 20 frame by frame of the imaging device 600.

In step S1210, the CPU 642 calculates the total luminance value by integrating the respective luminance values. In step S1220, the CPU 642 divides the contrast value obtained in step S1205 by the calculated total luminance value.

In step S1230, the CPU 642 decides whether the search is to be terminated. As one example, in a case where the range of reduction of the contrast value obtained after correction exceeds the value which is determined in advance, the CPU 642 decides to terminate the search. Alternatively, in a case where the focus lens 613 is moved over a range which is determined in advance, the CPU 642 may decide to terminate the search.

In a case where the CPU 642 decides to terminate the search (YES in step S1230), the CPU 642 proceeds the process to step S850. On the other hand, in a case where the CPU 642 decides not to terminate the search (NO in step S1230), the CPU 642 proceeds the process to step S840.

In step S1240, the CPU 642 determines the position of the focus lens 613 which corresponds to the contrast value which is obtained after correction and is the largest in the saturated region as the focus position (the focused focal point).

In step S1250, the CPU 642 determines the position of the focus lens 613 which corresponds to the largest contrast value obtained after correction as the focus position.

Owing to the above-described control, the imaging device 600 according to the second embodiment is able to increase a probability that the focus lens 613 will be installed at the focus position by using the corrected contrast value in comparison with the control according to the first embodiment.

[Third Embodiment]

The imaging device 600 according to each of the first and second embodiments is configured to calculate one kind of the contrast value for each of the respective luminance values of the plurality of imaging elements 621 by using one kind of the high-pass filter 624 and to determine the position of the focus lens 613 on the basis of this contrast value. An imaging device according to the third embodiment calculates two kinds of the contrast values by using two kinds of the high-pass filters which are different from each other in cutoff frequency. The imaging device more increases the probability that the focus lens 613 will be installed at the focus position by determining the position of the focus lens 613 on the basis of the two kinds of the contrast values.

(Imaging Device 1300)

Figure 13:
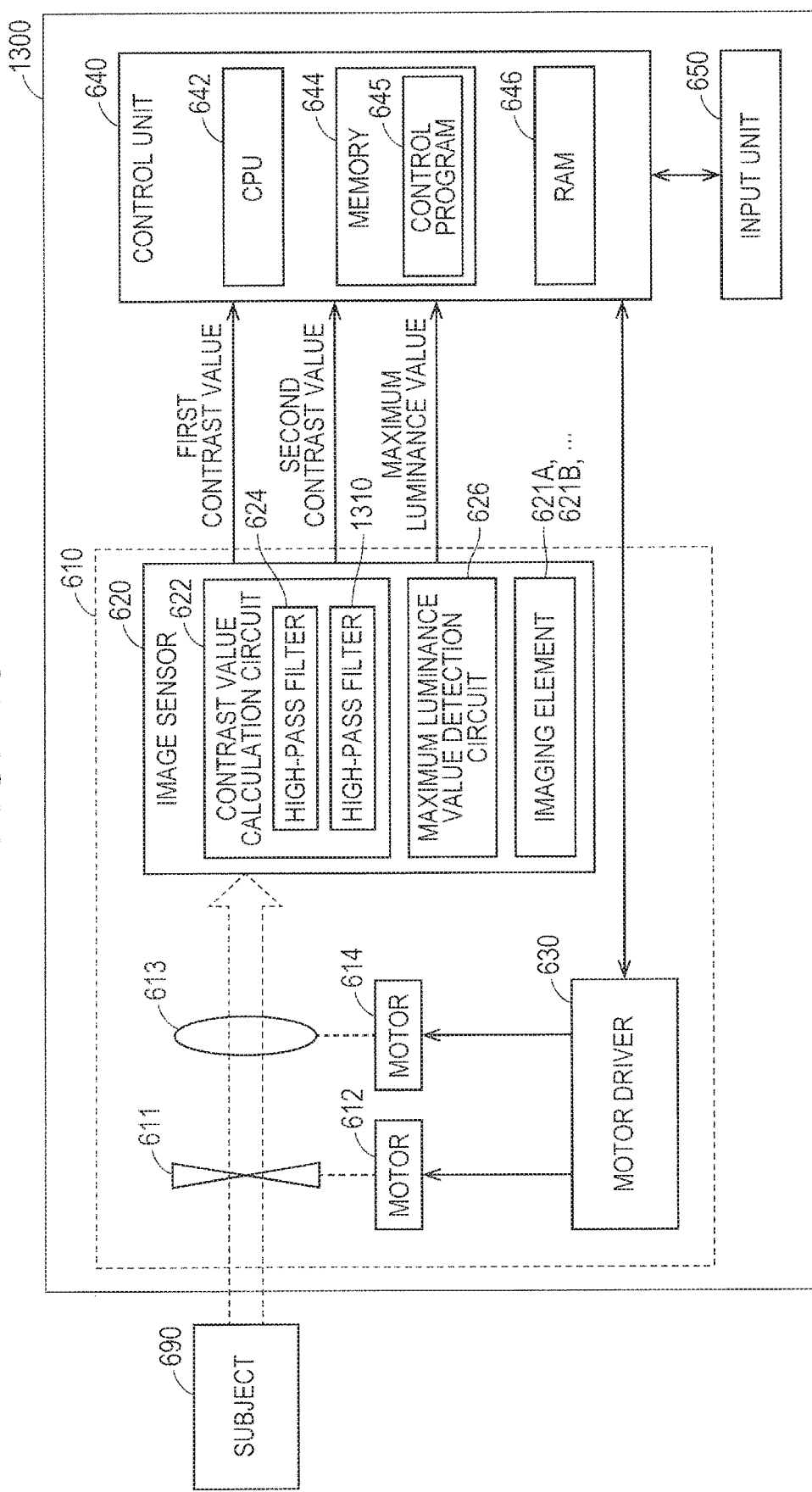
FIG. 13 is a diagram illustrating one configuration example of an imaging device according to a third embodiment.

FIG. 13 is a diagram illustrating one configuration example of the imaging device 1300 according to the third embodiment. Incidentally, in FIG. 13, the components to which the same symbols as those of the components in FIG. 6 are assigned are the same as the components in FIG. 6. Therefore, repetitive description of these components is not made.

Description will be made with reference to FIG. 13. The imaging device 1300 includes two kinds of high-pass filters, that is, the high-pass filter 624 and a high-pass filter 1310 which are different from each other in cutoff frequency. The cutoff frequency of the high-pass filter 1310 is higher than the cutoff frequency of the high-pass filter 624.

The contrast value calculation circuit 622 according to the third embodiment outputs each of a first contrast value which is calculated by using the high-pass filter 624 and a second contrast value which is calculated by using the high-pass filter 1310 to the control unit 640.

(Control for Determination of Focus Position)

Figure 14:
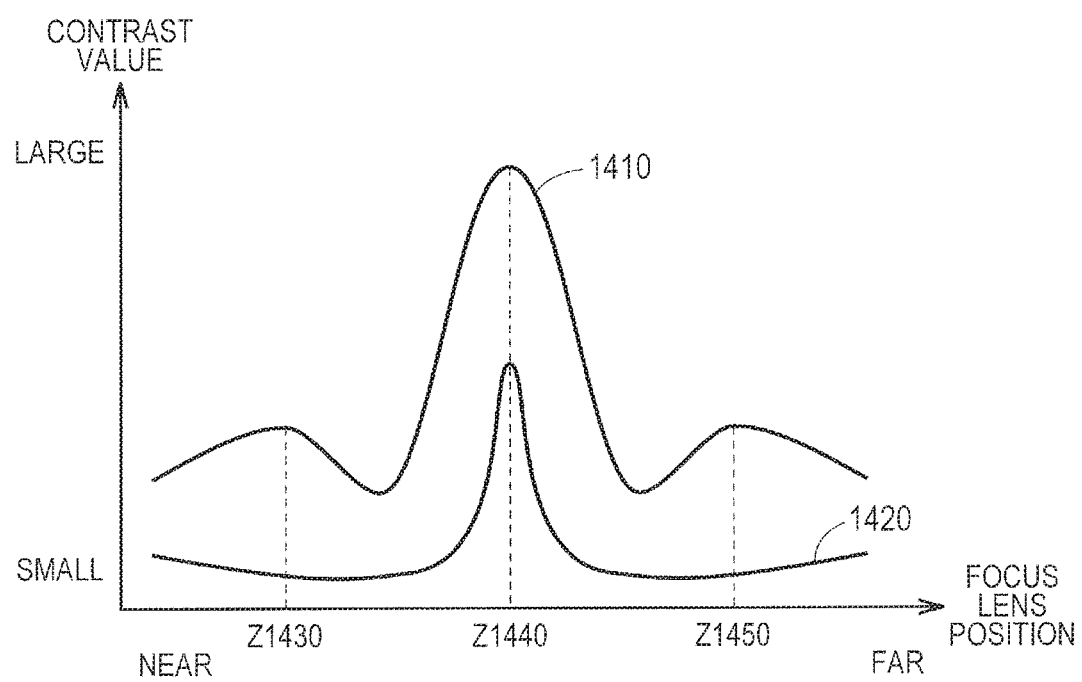
FIG. 14 is a diagram illustrating one example of the contrast value obtained in a case of using high-pass filters which are different from each other in cutoff frequency.

FIG. 14 illustrates one example of the contrast value obtained in a case where the high-pass filters 624 and 1310 which are different from each other in cutoff frequency are used. In FIG. 14, a line 1410 indicates the first contrast value obtained by using the high-pass filter 624 which is low in cutoff frequency. A line 1420 indicates the second contrast value obtained by using the high-pass filter 1310 which is high in cutoff frequency.

As indicated by the line 1410, since the high-pass filter 624 which is low in cutoff frequency is able to take an edge component of a low frequency out, the high-pass filter 62 is high in focus detection sensitivity. On the other hand, since the high-pass filter 624 which is low in cutoff frequency also takes image noises out of the low frequency, there are cases where use of the high-pass filter 624 may not be appropriate when handling a noisy image. Therefore, in a case where the focus position is detected by using the first contrast value (the line 1410) for the noisy image (the subject), the imaging device 1300 may install the focus lens 613 at a position (for example, a position 21430 and/or a position 21450) which is displaced from the focus position as a possibility.

As indicated by the line 1420, since the high-pass filter 1310 which is high in cutoff frequency takes only an edge component of a high frequency out, the focus detection sensitivity of the high-pass filter 1310 is low. Accordingly, in a case where the focus position is detected by using the second contrast value (the line 1420), there are cases where it may not be easy for the imaging device 1300 to accurately detect the focus position depending on the subject. On the other hand, since the high-pass filter 1310 which is high in cutoff frequency is not influenced by the noise of the low frequency, use of the high-pass filter 1310 is advantageous when handling the noisy image.

As described above, the characteristic of the high-pass filter is different depending on the cutoff frequency. Accordingly, the imaging device 1300 according to the third embodiment detects the focus position by using both of the first and second contrast values As one example, the imaging device 1300 may determine a position where both of the first and second contrast values take the maximum values as the focus position. As another example, the imaging device 1300 may determine a position where both of the first and second contrast values take maximal values (peak values) as the focus position. As further another example, the imaging device 1300 may determine a position where a value obtained by integrating the first contrast value and the second contrast value has the maximum value as the focus position.

Owing to the above-described configuration, the imaging device 1300 according to the third embodiment is able to suppress the influences of the kind of the subject, a photographic environment and so forth and therefore is able to more increase the probability that the focus lens 613 will be installed at the focus position.

(Flow of Control)

Figure 15:
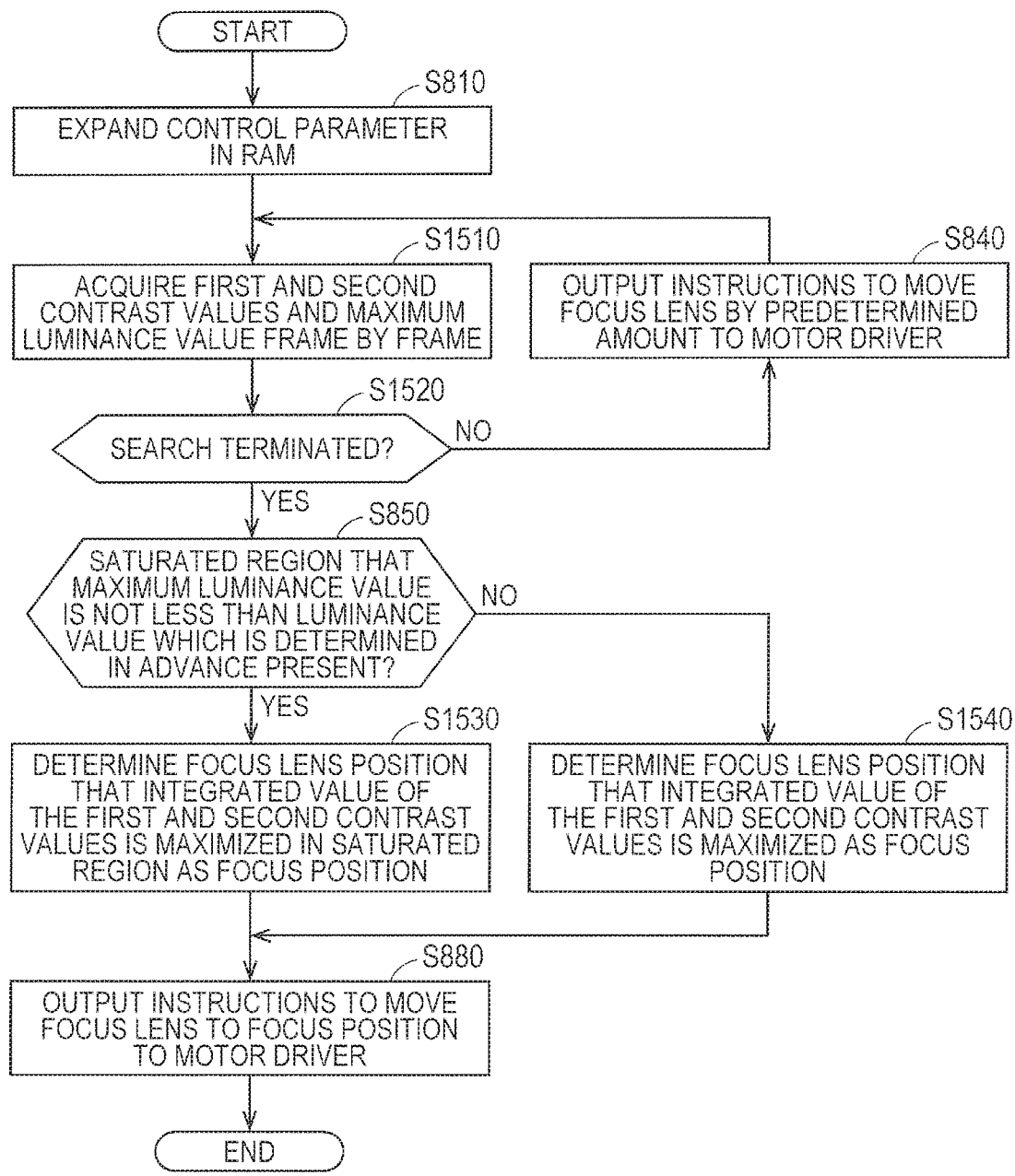
FIG. 15 is a flowchart (a part 3) illustrating one example of control for installation of the focus lens.

FIG. 15 is a flowchart illustrating one example of a series of the above-described controlling operations performed to install the focus lens 613. The CPU 642 executes the control program 645 stored in the memory 644 and thereby processes illustrated in FIG. 15 are achieved. Incidentally, in the processes illustrated in FIG. 15, the processes to which the same symbols as those in FIG. 8 are the same as the corresponding processes in FIG. 8. Therefore, repetitive description of the processes is not made.

In step S1510, the CPU 642 acquires the first contrast value, the second contrast value and the maximum luminance value from the image sensor 620 frame by frame.

In step S1520, the CPU 642 decides whether the search is to be terminated. As one example, in a case where the range of reduction of the first contrast value exceeds a first threshold value and in a case where the range of reduction of the second contrast value exceeds a second threshold value, the CPU 642 decides to terminate the search.

In a case where the CPU 642 decides to terminate the search (YES in step S1520), the CPU 642 proceeds the process to step S850. On the other hand, in a case where the CPU 642 decides not to terminate the search (NO in step S1520), the CPU 642 proceeds the process to step S840.

In step S1530, the CPU 642 determines a position of the focus lens 613 where the integrated value of the first and second contrast values reaches the maximum value in the saturated region as the focus position (the focused focal point).

In step S1540, the CPU 642 determines a position of the focus lens 613 where the integrated value of the first and second contrast values reaches the maximum value as the focus position.

Owing to execution of the above-described processes, the imaging device 1300 according to the third embodiment is able to suppress the influences of the kind of the subject, the photographic environment and so forth by using the two kinds of the contrast values which respectively correspond to the two kinds of the high-pass filters 624 and 1310 which are different from each other in cutoff frequency. Therefore, the imaging device 1300 is able to more increase the probability that the focus lens 613 will be installed at the focus position.

Incidentally, in the above-described example, the imaging device 1300 is configured to use the two kinds of the high-pass filters 624 and 1310 which are different from each other in cutoff frequency. Alternatively, the imaging device 1300 may be configured to use three or more kinds of the high-pass filters which are different from one another in cutoff frequency.

In addition, in the example illustrated in FIG. 15, the imaging device 1300 is configured to perform the processes in steps S1820, S1830 and S1840 by typically using the first and second contrast values (the two kinds of the contrast values). Alternatively, the imaging device 1300 may be configured to decide whether the two kinds of the contrast values are used and to perform the above-described processes by using the two kinds of the contrast values only in a case where it is decided to use the two kinds of the contrast values.

In general, the noisy image has a tendency that the total luminance value becomes high. Therefore, as one example, in a case where the total luminance value becomes not less than the threshold value which is determined in advance, the imaging device 1300 may be configured to perform the above-described processes by using the two kinds of the contrast values. Owing to the above-described configuration, in a case where it is decided not to use the two kinds of the contrast values, the imaging device 1300 is able to speed up the processes. Incidentally, in a case where it is decided not to use the two kinds of the contrast values, the imaging device 1300 is able to detect the focus position by using the first contrast value which corresponds to the high-pass filter 624 which is low in cutoff frequency.

Although, in the foregoing, it is described that the respective processes illustrated in FIG. 8, FIG. 12 and FIG. 15 are executed by one CPU 642. The constitutional element which executes the processes is not limited to the CPU 642. Each of the above-described processes may be executed by using at least one semiconductor integrated circuit such as a processor and so forth, at least one integrated circuit for specific application ASIC (Application Specific Integrated Circuit), at least one DSP (Digital Signal Processor), at least one FPGA (Field Programmable Gate Array) and/or a circuit or circuits having other arithmetic functions.

The above-described circuits may execute the respective processes described in FIG. 8, FIG. 12, FIG. 15 and so forth by reading one or more commands out of at least one tangible and readable medium.

Such a medium takes the forms of a magnetic medium (for example, a hard disk and so forth), an optical medium (for example, a compact disk (CD), a DVD and so forth), any type of memory such as a volatile memory, a nonvolatile memory and so forth, the medium is not limited to these forms.

The volatile memory may include a DRAM (Dynamic Random Access Memory) and an SRAM (Static Random Access Memory). The nonvolatile memory may include a ROM (Read Only Memory) and an NVRAM (Non-Volatile Random Access Memory). The semiconductor memory may be part of a semiconductor circuit together with at least one processor.

Although in the foregoing, the disclosure which has been made by the inventors and others has been specifically described on the basis of the embodiments, it goes without saying that the present disclosure is not limited to the above-mentioned embodiments and various alterations and modifications are possible within a range not deviating from the gist thereof.

What is claimed is:

1. A method comprising the steps of:
   (a) detecting luminance values corresponding to a plurality of imaging elements which detect light via a focus lens while moving the focus lens;
   (b) calculating a contrast value for evaluation of a focused state of a subject image on the basis of the detected luminance values corresponding to the imaging elements;
   (c) specifying the largest luminance value in the detected luminance values corresponding to the imaging elements;
   (d) specifying a range in which the largest luminance value is not less than a value which is determined in advance in a moving range of the focus lens; and
   (e) determining the position of the focus lens on the basis of the contrast value in the specified range of the position of the focus lens.

2. The method according to claim 1,
   wherein the step of determining the position of the focus lens includes determining the position of the focus lens to make the contrast value in the specified range of the position of the focus lens the largest.

3. The method according to claim 1,
   wherein the luminance value which is determined in advance is a value which is set to the largest luminance value.

4. The method according to claim 1 further comprising the steps of:
   (f) calculating a total value of the detected luminance values corresponding to the imaging elements; and
   (g) correcting the contrast value on the basis of the total value,
   wherein the step of determining the position of the focus lens includes determining the position of the focus lens on the basis of the corrected contrast value in the specified range of the position of the focus lens.

5. The method according to claim 4,
   wherein the step of correcting the contrast value includes dividing the contrast value by the total value.

6. The method according to claim 1,
   wherein the step of calculating the contrast value includes calculating a first contrast value and a second contrast value which respectively correspond to two kinds of high-pass filters which are different from each other in cutoff frequency on the basis of the detected luminance values for the imaging elements, and
   wherein the step of determining the position of the focus lens includes determining the position of the focus lens on the basis of the first and second contrast values in the specified range of the position of the focus lens.

7. The method according to claim 6,
   wherein the step of determining the position of the focus lens includes determining the position of the focus lens to make an integrated value of the first and second contrast values in the specified range of the position of the focus lens the largest.

8. An imaging device comprising:
   a focus lens;
   a motor which moves the focus lens;
   an image sensor which includes a plurality of imaging elements used for detection of light via the focus lens; and
   a control unit which controls the motor,
   wherein the image sensor is configured to
   detect luminance values corresponding to the imaging elements while moving the focus lens,
   calculate a contrast value for evaluation of a focused state of a subject image on the basis of the detected luminance values corresponding to the imaging elements and
   output the luminance values corresponding to the imaging elements and the contrast value to the control unit, and
   wherein the control unit is configured to
   specify the largest luminance value in the luminance values corresponding to the imaging elements,
   specify a range in which the largest luminance value is not less than a luminance value which is determined in advance in a moving range of the focus lens and
   determine the position of the focus lens on the basis of the contrast value in the specified range of the position of the focus lens.

* * * * *